E. LAUFER.
FRYING-PAN.

No. 173,305. Patented Feb. 8, 1876.

Witnesses
Saml. J. VanStavorn
Jos. B. Connolly

Inventor
Edwin Laufer,
By Connolly Bros.
Attorneys

UNITED STATES PATENT OFFICE.

EDWIN LAUFER, OF BETHLEHEM, PENNSYLVANIA.

IMPROVEMENT IN FRYING-PANS.

Specification forming part of Letters Patent No. 173,305, dated February 8, 1876; application filed January 15, 1876.

*To all whom it may concern:*

Be it known that I, EDWIN LAUFER, of Bethlehem, in the county of Northampton and State of Pennsylvania, have invented certain new and useful Improvements in Frying-Pans; and I do hereby declare the following to be a full, clear, and exact description of the invention, such as will enable others skilled in the art to which it pertains to make and use it, reference being had to the accompanying drawings, which form part of this specification, in which—

Figure 1:
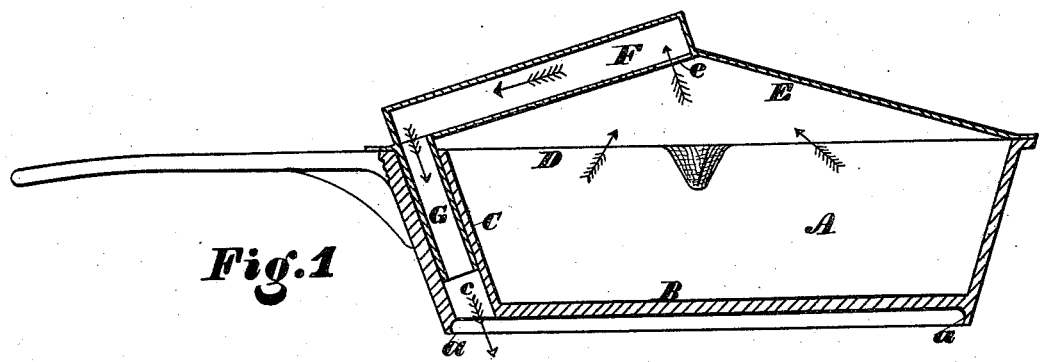
Figure 2:
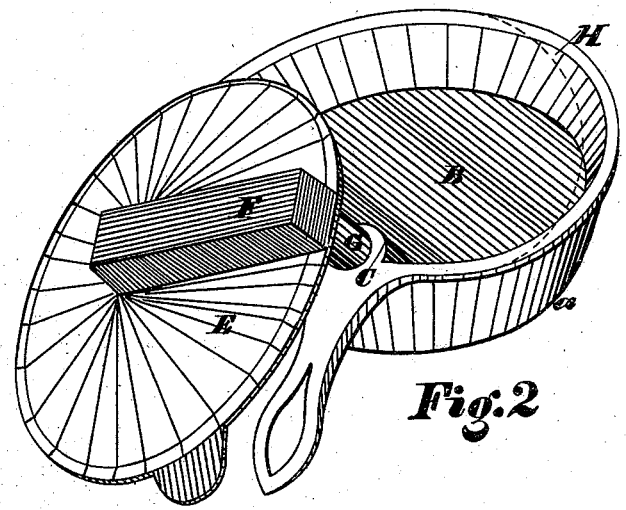

Figure 1 is a vertical central section, and Fig. 2 is a perspective view of my invention.

The object of my invention is to construct a frying-pan and its lid in such manner that the odors that usually emanate from various articles being cooked therein will be carried off through the fire by means of the chimney-draft, as hereinafter more fully described.

Referring to the accompanying drawing, A designates a cast-iron frying-pan formed with an annular bead or flange, *a*, around its lower edge, so that when the pan is resting on the stove its bottom B will be some little distance above the lid of the latter, for a purpose hereinafter more fully described. In casting the pan it is formed with a projection, C, extending from its upper edge D down to the bottom, said projection having a bore or aperture, *c*, which forms a draft opening or flue for the exit of steam and vapors, as also a socket for the lid-pintle, as will be more fully shown hereafter. E shows the lid, designed to be made of sheet metal and cone-shaped, having an opening, *e*, in its apex, communicating with a draft-passage, F, formed on the outer or upper side of said lid. G represents a branch from the passage F, of tubular cylindrical form, so as to be at once a flue for carrying off vapors and a pintle or pivot on which the lid may turn.

The operation is as follows: The article to be cooked is placed in the pan, the cover put on, and the pan then set on the stove. As soon as the articles begin to cook the ascending steam and vapors will pass into the opening *e* and be drawn thence, by the draft of the chimney, through the passages F, G, and *c*, into the fire and up the chimney. Should it be necessary at any time to partially remove the lid for putting in water or grease, or to let the article cooking "simmer," this may be effected by turning said lid on the passage G, as on a pivot. By leaving an opening between the lid thus turned back and the edge of the pan, as shown at H, access may be had to the contents of the pan, or the same will be open to inspection, so as to prevent burning, while at the same time the ascending vapors and odors will be carried off by the draft through the opening *e*.

The object of forming the pan with the bead *a* is to leave a passage between the bottom B and the stove for the vapors, &c., issuing from *c*, as it would not be practicable to have said opening in the middle of the pan, and as, owing to the fact that frying-pans are generally of greater diameter than the stove-openings, if the bottom B were to rest directly upon the top of the stove the draft through *c* would be cut off.

What I claim as my invention is—

The improved frying-pan herein described consisting of the tapering body A, of cast metal, having the annular bottom flange *a*, elevated bottom B, internal descending draft-tube C, of cylindrical form, and laterally-projecting handle, and the conical sheet-metal lid E, having the external soldered and inclined draft-tube F, and depending cylindrical branch G, said branch fitting the passage C and serving as a pivot upon which the lid is turned, substantially as shown.

In testimony that I claim the foregoing I have hereunto set my hand this 6th day of January, 1876.

EDWIN LAUFER.

Witnesses:
M. DANL. CONNOLLY,
JNO. A. BELL.